US012545285B2

(12) United States Patent
Beckwith

(10) Patent No.: US 12,545,285 B2
(45) Date of Patent: Feb. 10, 2026

(54) CLOUD-BASED AUTOMATED NAVIGATION

(71) Applicant: DISH Wireless L.L.C., Littleton, CO (US)

(72) Inventor: William Beckwith, Washington, DC (US)

(73) Assignee: DISH Wireless L.L.C., Littleton, CO (US)

( * ) Notice: Subject to any disclaimer, the term of this patent is extended or adjusted under 35 U.S.C. 154(b) by 255 days.

(21) Appl. No.: 18/366,783

(22) Filed: Aug. 8, 2023

(65) Prior Publication Data

US 2025/0050903 A1  Feb. 13, 2025

(51) Int. Cl.
*B60W 60/00* (2020.01)
*B60W 40/04* (2006.01)
*H04L 9/40* (2022.01)

(52) U.S. Cl.
CPC .......... *B60W 60/001* (2020.02); *B60W 40/04* (2013.01); *H04L 63/08* (2013.01); *B60W 2554/4041* (2020.02); *B60W 2556/35* (2020.02); *B60W 2556/50* (2020.02)

(58) Field of Classification Search
CPC ............... B60W 40/04; B60W 60/001; B60W 2554/4041; B60W 2556/50; B60W 2556/35; H04L 63/08
USPC ............................................................ 701/9
See application file for complete search history.

(56) References Cited

U.S. PATENT DOCUMENTS

| | | | |
|---|---|---|---|
| 10,501,055 B1* | 12/2019 | Yi | G06Q 50/40 |
| 2019/0325739 A1* | 10/2019 | Dorum | G01S 19/51 |
| 2020/0111358 A1* | 4/2020 | Parchami | G05D 1/028 |
| 2021/0064031 A1* | 3/2021 | Matsuda | B60W 60/001 |
| 2021/0064054 A1* | 3/2021 | Bang | G08G 1/096775 |
| 2022/0126864 A1* | 4/2022 | Moustafa | B60W 50/14 |
| 2023/0077360 A1* | 3/2023 | Rakshit | G06F 9/5027 |
| | | | 709/226 |
| 2023/0177963 A1* | 6/2023 | Joo | G08G 1/096716 |
| | | | 701/301 |

(Continued)

OTHER PUBLICATIONS

Khosyi'in et al, "Review and Design of GPS-RFID Localization for Autonomous Vehicle Navigation", Sep. 2019, EEET, (Year: 2019).*

*Primary Examiner* — Kenneth M Dunne
(74) *Attorney, Agent, or Firm* — Kilpatrick Townsend & Stockton LLP

(57) ABSTRACT

Automated navigation systems and methods are provided. An example method includes receiving a request for automated navigation service from an autonomous vehicle, the request including vehicle information and a destination of the autonomous vehicle. The method further includes receiving continuously real-time location and position measurements data from the autonomous vehicle, determining a virtual zone centered around the autonomous vehicle, identifying nearby vehicles proximate to the autonomous vehicles within the virtual zone, receiving continuously real-time location and position measurements data of the identified nearby vehicles, obtaining and updating real-time traffic environment data of the traffic environment, generating an optimal route segment for the autonomous vehicle in the virtual zone, and transmitting an instruction to the autonomous vehicle for guiding the autonomous vehicle to adjust operational parameters comply with the optimal route segment.

20 Claims, 4 Drawing Sheets

(56) References Cited

U.S. PATENT DOCUMENTS

2023/0365154 A1* 11/2023 Beauvisage .......... G06V 20/588

* cited by examiner

CLOUD-BASED AUTOMATED NAVIGATION

BACKGROUND

Autonomous vehicles (also known as automated vehicles or self-driving vehicles) have the capability to navigate without human intervention and offer benefits such as improved productivity and comfort, enhanced road safety, increased efficiency, and reduced congestion. Currently, navigation of autonomous vehicles relies on vehicle-based intelligence, such as video cameras, Light Detection and Ranging (LIDAR), onboard sensors, and on-board vehicle computing resources to gather and process data about the autonomous vehicles' surroundings. While vehicle-based intelligence has been proven valuable, it also presents challenges. For example, autonomous vehicles typically have limited energy power (e.g., batteries of electric vehicles) as well as computational resources. The onboard vehicle computing resources may consume considerable energy power but provide limited processing power, memory, and storage capacity, which may hinder the ability to perform complex calculations and process large amounts of data in real-time. In addition, a traditional vehicle-carried navigation system of an autonomous vehicle often relies solely on nearby vehicles for supplying data to the autonomous vehicle (e.g., through vehicle-vehicle interaction), but may not have access to a comprehensive view of the road network. The insufficient data coverage may further cause limited predictive capabilities and incomplete traffic condition information and thus compromise the overall effectiveness of route optimization. Thus, there is a need to improve navigation for autonomous vehicles.

SUMMARY

In accordance with some embodiments of the present disclosure, a method is provided. In one example, the method includes: receiving, in an automated navigation system in communication with an autonomous vehicle operating in a traffic environment over a wireless network, a request for automated navigation service from the autonomous vehicle, the request including vehicle information and a destination of the autonomous vehicle. The method further includes receiving continuously, in the automated navigation system, real-time location and position measurements data from the autonomous vehicle. The method further includes determining, by the automated navigation system, a virtual zone centered around the autonomous vehicle and extending to a boundary, based on the real-time location and position measurements data. The method further includes identifying, by the automated navigation system, nearby vehicles proximate to the autonomous vehicles within the boundary of the virtual zone. The method further includes receiving continuously, in the automated navigation system, real-time location and position measurements data from the identified nearby vehicles. The method further includes obtaining and updating, by the automated navigation system, real-time traffic environment data of the traffic environment. The method further includes generating, by the automated navigation system, a first optimal route segment for the autonomous vehicle in the virtual zone, based on the real-time location and position measurements data as well as the real-time traffic environment data received at a first time point ($T_1$). The method further includes transmitting, from the automated navigation system, a first instruction to the autonomous vehicle, the first instruction including the first optimal route segment and guidance for adjusting operational parameters for the autonomous vehicle to comply with the first optimal route segment until a second time point ($T_2$) later than $T_1$.

In accordance with some embodiments of the present disclosure, an automated navigation system is provided. In one example, the system includes: one or more processors and a computer-readable storage media storing computer-executable instructions. The computer-executable instructions, when executed by the one or more processors, cause the system to receive a request for automated navigation service from the autonomous vehicle, the request including vehicle information and a destination of the autonomous vehicle. The instructions further cause the system to receive continuously real-time location and position measurements data from the autonomous vehicle, determine a virtual zone centered around the autonomous vehicle and extending to a boundary, based on the real-time location and position measurements data, identify nearby vehicles proximate to the autonomous vehicles within the boundary of the virtual zone, receive continuously real-time location and position measurements data from the identified nearby vehicles, obtain and update real-time traffic environment data of the traffic environment, generate a first optimal route segment for the autonomous vehicle in the virtual zone, based on the real-time location and position measurements data as well as the real-time traffic environment data received at a first time point ($T_1$), and transmit a first instruction to the autonomous vehicle, the first instruction including the first optimal route segment and guidance for adjusting operational parameters for the autonomous vehicle to comply with the first optimal route segment until a second time point ($T_2$) later than $T_1$.

In accordance with some embodiments, the present disclosure also provides a non-transitory machine-readable storage medium encoded with instructions, the instructions executable to cause one or more electronic processors of a system to perform any one of the methods described in the present disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Overview

Figure 1:
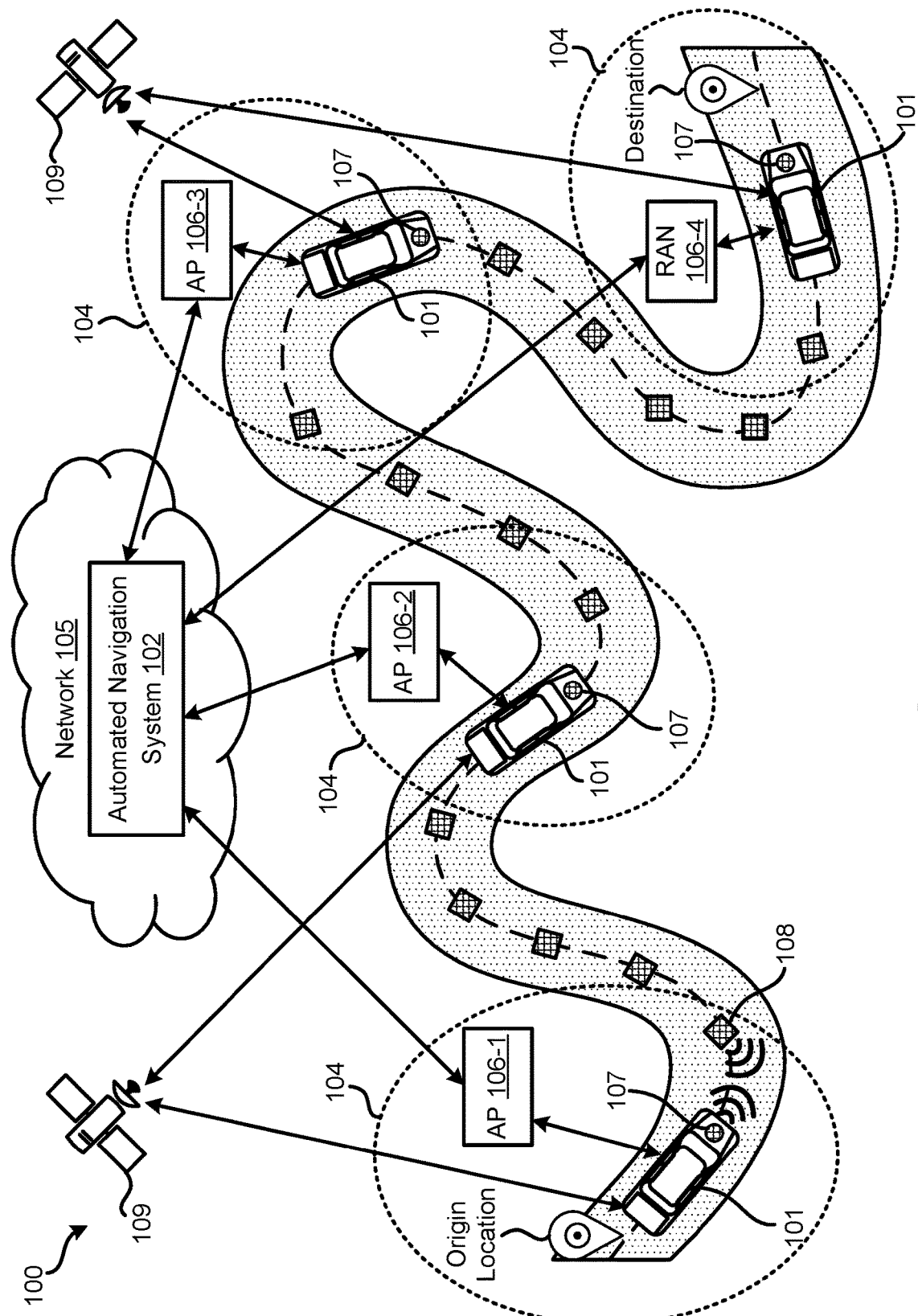
FIG. 1 is a schematic diagram illustrating an example communications system for provisioning automated navigation to an autonomous vehicle, according to various embodiments.

The present disclosure provides solutions to the above-mentioned challenges of onboard navigation system of autonomous vehicles. One insight provided in the present disclosure is related to cloud-based automated navigation systems and methods. In one example, the automated navigation system is implemented on a cloud-based infrastructure. According to some embodiments, the cloud-based infrastructure provides computing power, storage capacity, and networking capabilities for the automated navigation system to guide navigation for the autonomous vehicles. The automated navigation system includes a centralized processing center (CPC). The CPC receives real-time data (e.g., location and position measurements data indicating the three-dimensional (3D) location and position, velocity data, direction data, etc.) from an autonomous vehicle, nearby or surrounding vehicles, and other objects of the traffic infrastructure proximate to the autonomous vehicle. Based on the real-time data, the CPC performs complex calculations and generates navigation instructions. The CPC can optimize route for an autonomous vehicle to provide the autonomous vehicle with a 3D "virtual pathway" ("optimal route" or "optimal trajectory") towards the destination of the autonomous vehicle. The CPC may also employ various advanced algorithms, artificial intelligence (AI), and machine learning (ML) techniques to analyze data and optimize navigation decisions.

Another insight provided in the present disclosure is related to the leverage of high-speed and low-latency wired and wireless communications networks, such as 4G (the Fourth Generation)/Long-Term Evolution (LTE) wireless network, 5G (the Fifth Generation) wireless radio network, potentially 6G (the Sixth Generation) network, satellite network, optical fiber network, etc., to facilitate efficient real-time communication between the autonomous vehicle and the cloud-based infrastructure as well as real-time communication among various components of the cloud-based infrastructure. According to some embodiments, the automated navigation system can utilize the capacity of high-speed and low-latency wireless radio networks to exchange a large amount of real-time data between the autonomous vehicles and the cloud-based automated navigation system. The low-latency nature of the networks ensures minimal delays (e.g., millisecond or sub-millisecond levels) in data transmission and enables nearly instantaneous response of navigation commands and updates.

A further insight of the present disclosure is the utilization of various positioning technologies to determine the real-time 3D position of the autonomous vehicle with a high level of precision and accuracy (e.g., in a scale of centimeters). In one example, RFID (Radio Frequency Identification) technology can be used, in combination with other positioning techniques such as Global Position System (GPS), for identification, tracking, and determining the position of various parts and the overall outline of the autonomous vehicle. According to some embodiments, RFID tags are placed at fixed reference points along the road or within the environment where the autonomous vehicle operates. The autonomous vehicle is equipped with multiple RFID receivers located at the bottom, top, sides, edges, corners, tires, or various other parts of the vehicle. When the autonomous vehicle operates, the RFID receivers capture the signals transmitted by the RFID tags. The received power of these signals can be used to estimate the distance between the vehicle and the defined and known location of each detected RFID tag. The signal data can be immediately and automatically transmitted to the automatic navigation system. By analyzing the received power from multiple RFID tags, the automatic navigation system can triangulate the autonomous vehicle's position relative to the known locations of the RFID tags and generate real-time location and position information of the autonomous vehicle. In some embodiments, a positioning system or computing device in communication with the automated navigation system may generate real-time location and position information of the autonomous vehicle and transmit the real-time location and position information to the autonomous vehicle.

Based on the real-time location and position data of the autonomous vehicle and other nearby vehicles, the automated navigation system can, as mentioned above, optimize the route for the autonomous vehicle and generate a virtual pathway towards the identified destination. The automated navigation system can further determine a dynamic virtual zone centered around the autonomous vehicle that would move with the autonomous vehicle as the autonomous vehicle moves and can calculate an optimal route segment in a virtual zone for the autonomous vehicle to follow. The automated navigation system can provide real-time guidance-instruction data to the autonomous vehicle. This guidance-instruction data includes instructions on adjusting the operational parameters of the autonomous vehicle such as speed, direction, bearing, propulsion, etc. for the autonomous vehicle to stay on the designated virtual pathway or the optimal route segment. The automated navigation system takes into account the continuous monitoring of the autonomous vehicle's location, position, velocity, bearing, and direction, along with the evolving traffic environment conditions, to make necessary micro-adjustments and keep the vehicle aligned with the optimal route.

It should be understood that various technical solutions provided herein are not limited to land-based vehicle navigation, but can also be applied in other domains such as aviation and maritime traffic. The term "road" as used herein could include traditional roadways, but could also include any path of travel in a 3D space. Guidance could include data that accounts for yaw, pitch, and roll in a 3D space defined dynamically by spatial coordinates such as a set of Cartesian coordinates [X, Y, Z].

Example Communications Systems, Networks, Methods, and Computer Systems

FIG. 1 is a schematic diagram illustrating a communications system 100 (hereinafter "system 100") for provisioning automated navigation to autonomous vehicles. The system 100 includes, among other components, an autonomous vehicle 101 and an automated navigation system 102 in communication with the autonomous vehicle 101. The automated navigation system 102 is implemented on a high-speed and low-latency wireless network 105 (herein after "network 105"). The automated navigation system 102 is in communication with the autonomous vehicles 101 over the network 105, and various information including real-time location and position measurements data as well as navigation instructions are transmitted in the communication between the automated navigation system 102 and the autonomous vehicles 101 over the network 105.

The network 105 may be a 5G network, or a potentially 6G network or 7G network. In some embodiments, the network 105 is a 5G New Radio (NR) cellular network. In some embodiments, the network 105 includes, among other components, a Core Network (CN) (e.g., a 5G core), a Radio Access Network (RAN), a one or more Baseband Units (BBU), one or more Distributed Units (DUs), a Centralized Unit (CU), and various network elements or network functions (NFs).

The CN is responsible for managing and controlling the overall network operations. The CN may include various network functions such as Network Repository Function (NRF), Network Slice Selection Function (NSSF), Home Subscriber Server (HSS), Authentication Server Function (AUSF), Unified Data Management (UDM), Policy Control and Charging Rules Function (PCRF), Charging Function (CHF), Access and Mobility Management Function (AMF), Session Management Function (SMF), User Plane Function (UPF).

The RAN includes multiple base stations or access points (APs) 106 (e.g., 106-1, 106-2, 106-3, 106-4, etc.) across an area where the autonomous vehicles 101 operates. The APs 106 may include gNBs (gNodeBs) or base stations in the network 105 responsible for transmitting and receiving wireless signals. The APs 106 allow the autonomous vehicles 101 to communicate with the automated navigation system 102 over the air interface in a seamless and instantaneous or nearly instantaneous manner. The BBU is a component of the base station responsible for the baseband processing functions, such as signal modulation/demodulation, encoding/decoding, beamforming, and radio resource management. The DU is responsible for processing and forwarding radio signals between the gNB and the BBU as well as optimizing the processing load and reducing latency by distributing some functions closer to the edge of the network. The CU is responsible for higher-level functions such as network management, scheduling, and control. The CU interfaces with the DU and manages multiple gNBs to ensure efficient network operations.

The RAN of the network 105 may be an open radio access network (O-RAN). In an O-RAN, because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

As mentioned above, the automated navigation system 102 is executed on a cloud computing platform. The cloud computing platform may include of multiple geographically distributed regions located across the entire traffic environment in which the autonomous vehicles operate. Each region of the cloud computing platform may further include a cluster of edge servers (not shown) placed to optimize proximity to the autonomous vehicle and reduce network latency. The edge server located in close proximity to the autonomous vehicle may cache real-time data, dispensing the need to retrieve the data from a centralized data center and further reducing latency.

In one example implementation, an autonomous vehicle 101 starts operation from an origin location towards a destination, as shown in FIG. 1. The autonomous vehicle 101 can establish a high-speed and low-latency connectivity with the automated navigation system 102 through the multiple APs 106 (e.g., 106-1, 106-2, 106-3, and 106-4) provided by the network 105 along the pathway to the destination. The AMF of the CN may authenticate and authorize the access of autonomous vehicle 101 to the network 105 and handles mobility-related procedures. The SMF may manage the session establishment and maintenance for the communication of autonomous vehicle 101 with the automated navigation system 102 and handle the routing and forwarding of data between the autonomous vehicle 101 and other network functions. Various other NFs such as the HSS, UPF, PCF, and others within the CN may work in a conjunctive manner to provide seamless connectivity, data processing, and policy enforcement for the autonomous vehicle 101.

The autonomous vehicle 101 includes one or more location and position tracking devices 107 (herein after "tracking devices" 107). The tracking device 107 may be a wireless device responsible for measuring real-time location and position of the autonomous vehicle 101. Examples of the tracking devices include but are not limited to Radio Frequency Identification (RFID) readers (also known as a RFID transceiver) or other positioning sensors. In some embodiments, multiple tracking devices 107 are installed at various locations on the autonomous vehicle 101 to closely track its location and position. These tracking devices are strategically placed on the bottom, top, inside, sides, edges, corners, tires, or other suitable locations interior or exterior to the autonomous vehicle 101. By having multiple tracking devices 107 distributed across the autonomous vehicle 101, a more comprehensive and accurate picture of its location can be obtained.

In one example, the tracking device 107 is a RFID reader. The RFID reader 107 may be used to interact with multiple RFID tags 108 to measure the location and position of the autonomous vehicle 101. RFID tags 108 can be installed in reference points or specific locations of the area or road network where the autonomous vehicle 101 operates. The reference points may be installed on fixed road infrastructure such as embedded road markers and roadside markers, fixed infrastructure such as traffic signs, lamp posts, or utility poles located at positions along the road network, landmarks or points of interest of the road network, such as buildings, bridges, or distinctive objects, and predefined grid pattern or at specific grid points on the road network. The position of each reference marker can be defined and recorded in the automated navigation system using Cartesian x, y, and z coordinates to precisely define the position of the reference marker in a three-dimensional space. The RFID reader 107 of the autonomous vehicle 101 can detect the RFID tags 108 to determine the location and position of the autonomous vehicle 101 relative to the RFID tags 108.

The RFID reader 107 includes an antenna, a transceiver, and a decoder and is configured emit radio frequency (RF) signals (or RFID signal), initiate communication with RFID tags, and receive signals from RFID tags 108. Each RFID tag 108 includes a microchip, a memory, and an antenna and has a unique ID or specific data such as a serial number stored in the memory. When the RFID reader 107 is brought within range of an RFID tag 108, the RFID reader 107 emits RF signals. When an RFID tag 108 receives the RF signals from the RFID reader 107, the RFID tag 108 uses the energy from the RF signal to power up and responds by transmitting back the unique ID or the serial number stored in the memory back to the RFID reader 107. The RFID reader 107 receives the response from the RFID tag 108 and decodes the information included in the response. The data from the RFID tag 108, such as the unique identifier or specific data stored on the tag, can be processed and utilized by the reader or a connected system.

The RFID signals transmitted between the RFID reader 107 and RFID tags 108 may include various frequency bands depending on the application and region. In some embodiments, the RFID frequency bands may be in the range of 125 kHz to 134 kHz (low RFID frequency), in the range of 13 MHz to 14 MHz (high RFID frequency), or in the range from 860 MHz to 960 MHz (ultra-high RFID frequency).

The RF signals from the RFID tag 108 received by the RFID reader 107 can be further processed and analyzed to generate location and position measurements data (also referred to and used interchangeably with "measurements data"), using suitable positioning algorithms. In some embodiments, a received signal strength indication (RSSI) method can be applied to position the autonomous vehicle 101. The power of the RF signal is measured and analyzed, and a triangulation or trilateration algorithm is used to calculate the distance between the RFID reader 107 on the autonomous vehicle 101 and the RFID tag 108. The variation in received power across the different RFID readers on the autonomous vehicle 101 can be used to generate measurements data with high-precision and high-accuracy. In some embodiments, the autonomous vehicle 101 could be equipped with multiple RFID readers 107 located at the bottom, top, sides, edges, corners, tires, or various other parts of the vehicle.

The autonomous vehicle 101 is capable of transmitting the measurements data to the automated navigation system 102 in real time. Once the measurements data is generated, it is promptly transmitted from the autonomous vehicle 101 to the automated navigation system 102. In some embodiments, a time delay between a time point when data is generated and a time point when the data is transmitted is no more than a minimum time delay (e.g., 50 microseconds (ms)). As used herein and in a context of autonomous vehicles, any process of data generation, transmission, exchange, processing, and reception with a latency of 50 ms or below is considered as an "instantaneous" or "near-instantaneous" process. This instantaneous or near-instantaneous transmission of measurements data allows the automated navigation system 102 to receive up-to-date and accurate location and position information about the vehicle's location and position.

It should be noted that the RFID technology (i.e., the RFID reader and RFID tags) is only one example for generating real-time location and position information of the autonomous vehicle 101. Other positioning techniques are also possible, such as Time Difference of Arrival (TDOA) and Angle of Arrival (AOA) location methods using RF signals received from multiple base stations located at cell towers in a mobile wireless network (e.g., the APs 106). As an example, the autonomous vehicle 101 is equipped with multiple receivers or antennas, each capable of receiving signals from different APs 106. In some embodiments, the autonomous vehicle 101 receives RF signals from multiple base stations simultaneously and measures the time difference between the arrival of those signals. The known positions of the APs 106 and the known speed of RF signal transmission can be used to calculate the difference in distance between the autonomous vehicle 101 and each AP 106. By combining the distance differences from multiple APs 106, the location of the vehicle can be calculated through trilateration algorithms.

In some embodiments, the autonomous vehicle 101 further includes a Global Positioning System (GPS) device or other similar satellite-based positioning devices. The GPS and RFID can be combined to enhance the accuracy and precision of location and position measurements for autonomous vehicles. GPS provides accurate geolocation signals such as a set of Cartesian coordinates [X, Y, Z] to accurately describe the latitude, longitude, and altitude of the autonomous vehicle 101. RFID provides more localized positioning and identification capabilities. The GPS signals can be used to verify the general geolocation of the autonomous vehicle 101 and serve as a baseline for the measurements. The RFID tags placed at specific, defined locations along the pathway of the autonomous vehicle 101 can then be used to validate and refine the position within that general location. The GPS signals and RFID signals can be fused or combined to generate more accurate and precise location and position measurements data (e.g., with an accuracy level of centimeters). By comparing the GPS coordinates with the expected RFID-tagged locations, any discrepancies or errors can also be detected and corrected in real time. It should be noted that other positioning devices and technologies can also be used, additionally or alternatively, to generate real-time location and position measurements data of the autonomous vehicle 101.

As mentioned above, various location and position signals (e.g., GPS signals, RFID signals, etc.) can be processed by the vehicle onboard system of the autonomous vehicle 101 to generate real-time location and position measurements data. The real-time measurements data can be instantaneously or nearly instantaneously transmitted to the automated navigation system 102 in a continuous manner during its operation, by taking advantages of the high-speed and low latency network 105.

In some embodiments, in the network infrastructure of the automated navigation system 102, a variety of frequency bands are utilized to optimize distance coverage and mitigate interference. For example, these frequency bands may include low-band (RF<1 GHZ), mid-band (1 GHz>RF<6 GHZ), and high-band or mmWave (millimeter wave) (RF>6 GHz). The use of different frequency bands may allow for efficient transmission of data over varying distances in different environments. For example, low-band frequencies provide better coverage and penetration through obstacles and may be used for long-range communication. Mid-band frequencies provide a balance between coverage and data capacity and may be used for urban and suburban areas. High-band frequencies may be used for dense urban environments with shorter communication distances but with higher capacity demands than low-band or mid-band can typically satisfy. It should be noted that frequency bands used in triangulation may be substantially different from the frequency bands used for RFID signals in order to avoid signal interference.

The automated navigation system 102 is configured to receive origin and destination information from the autonomous vehicle 101, receive real-time location and position measurements data from the autonomous vehicle 101, receive real-time location and position measurements data from vehicles nearby and surrounding the autonomous vehicle 101 along the moving direction thereof (hereinafter "nearby vehicles"), process the real-time location and position measurements data to calculate the real-time relative position of the autonomous vehicle 101 to the nearby vehicles (hereinafter "relative position"), transmit the real-time relative position data to the autonomous vehicle 101, perform route optimization to generate an optimized route towards the destination, generate instructions to adjust the operational parameters of the autonomous vehicle 101, and continuously transmit the optimized pathway and the instructions to the autonomous vehicle 101 through instantaneous or near instantaneous communications over the network 105.

In some implementations, the automated navigation system 102 can create a "virtual zone" 104 (or virtual bubble), which encompasses the autonomous vehicle 101 and extends to a specified range around it. The automated navigation system 102 can utilize advanced algorithms and communication protocols to identify and track nearby or surrounding vehicles within the virtual zone 104. The location and position data of both the autonomous vehicle 101 and the nearby vehicles within the virtual zone 104 are collected and transmitted to the automated navigation system 102 for analysis and processing. In some embodiments, the virtual zone 104 is centered around the autonomous vehicle 101 and moves along the route towards the destination with the movements of the autonomous vehicle and continuously adapts to the changing environment. As the autonomous vehicle 101 progresses along the route, the virtual zone 104 dynamically adjusts its position and size to encompass the immediate vicinity of the autonomous vehicle 101. The automated navigation system 102 continuously monitors the movement of the autonomous vehicle 101 and updates the virtual zone 104 accordingly. By constantly tracking the position and direction of the autonomous vehicle 101, the automated navigation system 102 can maintain the virtual zone 104 centered around the autonomous vehicle 101 and aligns with its trajectory towards the destination.

Within the virtual zone 104, the automated navigation system 102 identifies nearby vehicles as well as other stationary and moving objects (e.g., pedestrians, non-motor transportation tools such as bicycles, scooters, etc.) from the traffic infrastructure that fall within the range of the virtual zone 104. The automated navigation system 102 receives real-time location and position data from these nearby vehicles, assess their proximity to the autonomous vehicle 101, and determine the relative positions, distances, and trajectories of the nearby vehicles in relation to the autonomous vehicle 101. The automated navigation system 102 can also obtain real-time traffic environment data from other public or commercial resources. Based on the real-time location and position data as well as the traffic environment data, the automated navigation system 102 can perform comprehensive analysis and optimization of the route within the virtual zone 104, by considering multiple factors such as traffic conditions, road networks, and the relative positions of the nearby vehicles provided in the data. The automated navigation system 102 generates an optimal route segment for the autonomous vehicle within the virtual zone 104. As the virtual zone 104 moves towards the destination, the optimal route segment generated by the automated navigation system 102 within the virtual zone 104 dynamically adapts to the changing position and trajectory of the autonomous vehicle 101.

The automated navigation system 102 further generates an instruction for the autonomous vehicle 101 to follow the optimal route segment within the virtual zone 104. The instruction, along with the location and position data of nearby vehicles, may be instantaneously or nearly instantaneously transmitted to and received by the autonomous vehicle 101. The instruction may be generated based on multiple factors. For example, the instruction may aim to minimize the overall travel time for the autonomous vehicle 101, by considering factors such as the current traffic conditions, road speed limits, and historical traffic conditions and patterns. The instruction may also take into account real-time traffic information to avoid/bypass congested areas or routes and maintain a smooth journey. The instructions may also be provided for lane changes, turns, and other necessary actions that align with the capabilities and safety guidelines of the autonomous vehicle 101.

As the virtual zone 104 moves along the route towards the destination, a dynamic, seamless, and interconnected network of information exchange (i.e., a mesh matrix) between the automated navigation system 102 and the vehicles within the virtual zone 104 can be generated. The seamless mesh matrix may allow for real-time updates and adjustments based on the changing road and traffic conditions along the route.

Use of the virtual zone 104 and segmentation of the optimal route for the autonomous vehicle 101 can allow the automated navigation system 102 to focus on a specific area around the autonomous vehicle 101 and narrow down the analysis to the immediate surroundings and nearby vehicles within the virtual zone 104, thereby improving the efficiency of data processing and route optimization, enhancing the safety as well as the overall navigation experience for the passenger(s) of the autonomous vehicle 101.

In some implementations, the automated navigation system 102 may be in real-time communication with multiple autonomous vehicles 101, create a virtual zone for each autonomous vehicle 101, and perform route optimization for each autonomous vehicle 101. By enabling real-time communication and personalized route optimization, the automated navigation system 102 can enhance the overall efficiency, safety, and effectiveness of autonomous vehicle navigation.

Figure 2:
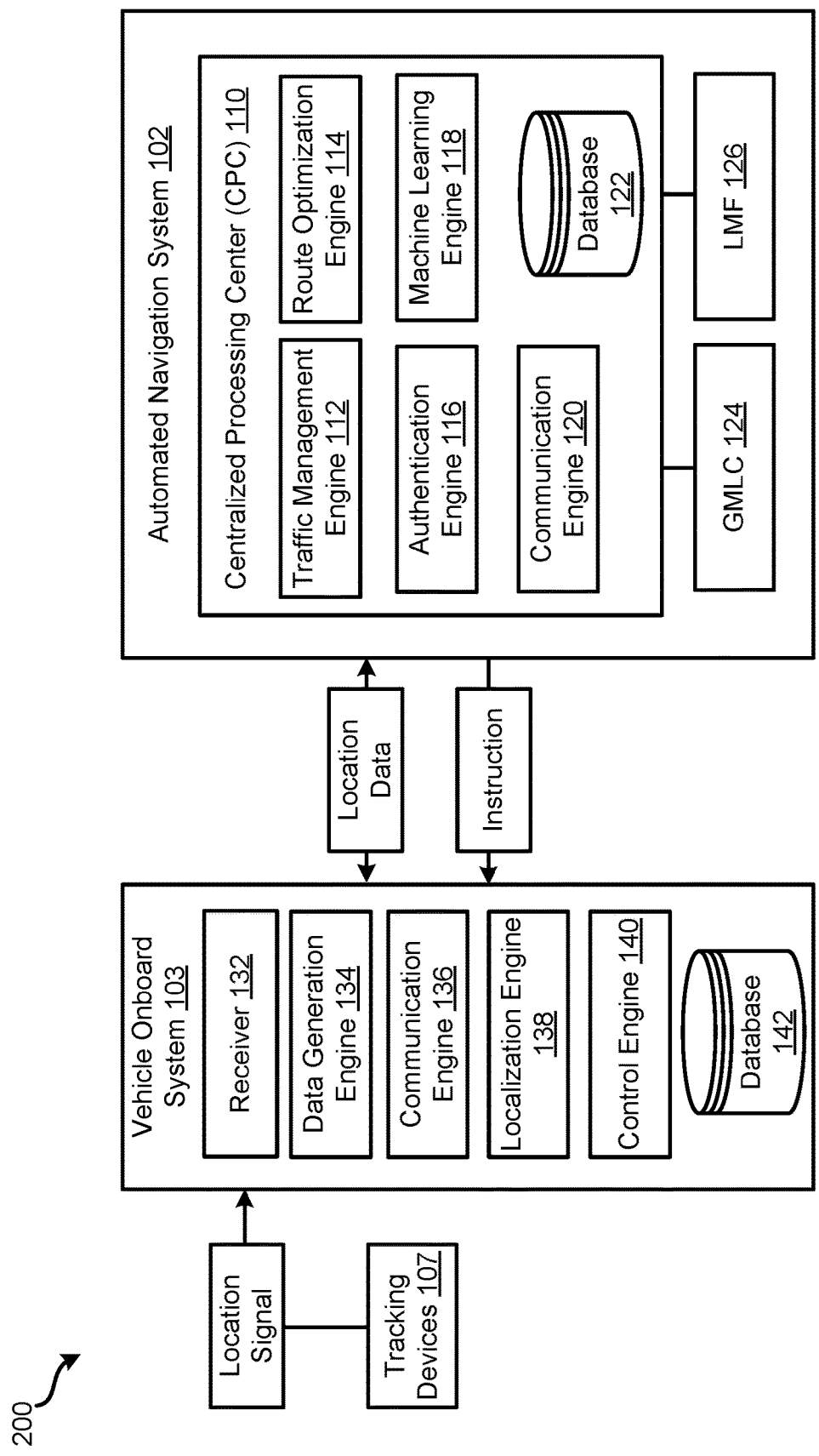
FIG. 2 is a schematic block diagram illustrating another example communications system, according to various embodiments.

FIG. 2 is a schematic block diagram illustrating another example communications system 200 (hereinafter "system 200"), according to various embodiments. In the illustrated example, the system 200 includes an automated navigation system 102 and a vehicle onboard system 103 of the autonomous vehicle 101. The vehicle onboard system 103 is in communication with the automated navigation system 102 and the tracking device 107 (shown in FIG. 1).

The vehicle onboard system 103 includes, among other components, a receiver 132, a data generation engine 134, a communication engine 136, a localization engine 138, a control engine 140, and a database 142. Each component of the vehicle onboard system 103 may be in a form of hardware, software, or a combination of both. Additional components may be included.

The receiver 132 is configured to capture and demodulate signals from various sources. The receiver 132 may receive wireless signals 205, such as GPS signals, RFID signals, and communication signals from the automated navigation system 102 and the tracking device 107. The receiver 132 may employ signal processing techniques to extract relevant information from the received signals. The data generation engine 134 includes algorithms and has computational capabilities to process the received signals and extracted information to generate location and position measurements data. In some embodiments, the data generation engine 134 employs sensor fusion techniques to combine signals from different sensors, such as GPS, inertial sensors, cameras, etc., to generate measurements data regarding the comprehensive environment of the autonomous vehicle 101.

The communication engine 136 is configured to establish bilateral communication with the automated navigation system 102 over the network 105. The communication engine 136 may be used to transmit the real-time location and position measurements data to the automated navigation system 102 and receive real-time location and position measurements data of nearby vehicles from the automated navigation system 102. The communication engine 136 may be also configured to establish communication with other external sources such as other vehicles, infrastructure systems, traffic management systems, or any other relevant entities.

The localization engine 138 within the vehicle onboard system 103 is configured to determine and update the relative location and position of the autonomous vehicle 101 in relation to the nearby vehicles and traffic infrastructure in the virtual zone of the autonomous vehicle 101. Based on the location and position measurements data from the autonomous vehicle 101 as well as the nearby vehicles, the localization engine 138 may calculate the proximity of each part of the autonomous vehicle 101 to each one of the nearby vehicles. The localization engine 138 may also utilize a digital map or reference data to enhance the accuracy of the vehicle's localization. In some implementations, the localization engine 138 may perform a map matching process by comparing the measurements data with the known locations of map features such as road networks, landmarks, or RFID tag locations to improve the accuracy of the relative position. In some embodiments, the accuracy of the relative position may be at a level as low as centimeters.

The control engine 140 is responsible for generating control commands to regulate the operation of the autonomous vehicle 101. The control engine 140 may use the instruction as well as the location and position measurements data from nearby vehicles from the automated navigation system 102 to compute control inputs. The control engine 140 may employ model-based control algorithms, such as proportional-integral-derivative (PID) control or model predictive control (MPC), to calculate optimal control inputs for the actuators of the autonomous vehicle 101, such as throttle, brakes, steering, and propulsion systems.

The database 142 of the vehicle onboard system 103 is configured to store and manage structured and unstructured data relevant to the operation of the autonomous vehicle 101. The database 142 may contain information such as digital maps, road network data, sensor calibration parameters, historical location and position measurements data, and algorithms used by other components of the vehicle onboard system 103. The database 142 may allow the vehicle onboard system 103 to instantaneously or nearly instantaneously access and retrieve necessary data during real-time operations.

The automated navigation system 102 may include, among other components, a centralized processing center (CPC) 110, and one or more network functions of the network 105, including a Gateway Mobile Location Center (GMLC) 124 and a Location Management Function (LMF) 126. For example, the GMLC 124 may serve as an interface between the automated navigation system 102 and the network infrastructure of the network 105. The GMLC 124 may communicate with the other network elements, such as base stations, to obtain accurate and up-to-date information regarding the autonomous vehicle 101 and relay the information to the automated navigation system 102. The LMF 126 may be responsible for managing and updating location information of the autonomous vehicle 101 within the network infrastructure of the network 105. The LMF 126 may receive updates on the location and position measurements data from the autonomous vehicle 101, other vehicles in the virtual zone 104, as well as other network elements of the network 105.

As mentioned above, the CPC 110 serves as the central hub for processing and managing data related to the navigation and operation of autonomous vehicles 101. The CPC 110 also coordinates and integrates various components and functions within the automated navigation system 102. In some embodiments, the CPC 110 further includes, among other components, a traffic management engine 112, a route optimization engine 114, an authentication engine 116, a machine learning engine 118, a communication engine 120, and a database 122.

The traffic management engine 112 is configured to handle the real-time monitoring and management of traffic conditions for the autonomous vehicle 101. The traffic management engine 112 may collect information from various sources, including traffic infrastructure sensors, road cameras, and historical traffic patterns, to generate up-to-date traffic environment data regarding traffic congestion, accidents, as well as road conditions in the virtual zone 104 and along the optimal route towards the destination of the autonomous vehicle 101. The traffic environment generated by the traffic management engine 112 can be used, in combination with the location and position measurements data of the vehicles in the virtual zone 104, to optimize routes and make informed decisions regarding the movement of the autonomous vehicle 101.

The route optimization engine 114 is configured to calculate the most efficient and optimal route for the autonomous vehicle 101. In some implementations, the route optimization engine 114 can generate optimal route segment for the autonomous vehicle 101 in the virtual zone 104. The route optimization engine 114 analyzes the collected traffic environment data to identify available routes as well as areas of congestion, roadblocks, or other traffic-related issues in the virtual zone 104 or along the route(s) towards the destination, by considering factors such as traffic flow, average speeds, historical data, road network topology, vehicle constraints, road capacity, etc., to assess the current and predicted traffic conditions. The route optimization engine 114 may employ specific optimization algorithms, such as shortest path algorithms or heuristic algorithms, to calculate the optimal route and optimal route segment for the virtual zone 104, taking into account any specific user preferences or system objectives, such as minimizing travel time, avoiding congested areas, maximizing fuel efficiency, or prioritizing safety. The route optimization engine 114 continuously monitors the real-time traffic environment data as well as location and position measurements data of the autonomous vehicle and nearby vehicles within the virtual zone 104. The route optimization engine 114 can also dynamically adjust the route and route segment as needed to adapt to changing traffic conditions or unexpected events, such as accidents or road closures.

Once the optimal route and route segment for the virtual zone 104 is calculated, the route optimization engine 114 can generate an instruction and instantaneously or nearly instantaneously communicate the instructions to the autonomous vehicle 101 via the communication engine 120. The instruction may include specific maneuvers, lane changes, acceleration/braking adjustment, or other operational parameters for the autonomous vehicle 101 to follow within the virtual zone 104 to optimize the entire path towards the destination. The optimal routes and optimal route segments can be defined and calculated using a plurality of 3D positions, each 3D position represented by a set of Cartesian coordinates [X, Y, Z] corresponding to latitude, longitude, and altitude, respectively, providing accurate and precise guidance for the autonomous vehicle 101 in a 3D space. Compared with the traditional roadway networks that are limited to 2D representations, the optimal routes and route segments utilizing 3D positions according to the present disclosure allows the autonomous vehicles 101 to navigate beyond typical 2D roadway networks and/or through various non-conventional areas where precise and accurate 3D positioning becomes essential for safety and efficiency.

The authentication engine 116 within the CPC 110 is configured to verify the authenticity and integrity of the user and incoming data. The authentication engine 116 may also establish and maintain secure communication channels within the automated navigation system 102. Various encryption/decryption protocols and cryptographic algorithms may be used to protect the confidentiality and integrity of data transmitted over the network 105. Example cryptographic protocols include but are not limited to Transport Layer Security (TLS), Secure Telephony Identity Revisited (STIR), Signature-based Handling of Asserted Information Using toKENS (SHAKEN).

The machine learning engine 118 within the CPC 110 is configured to analyze and process large amounts of data to improve the performance and decision-making capabilities of the automated navigation system 102. In some embodiments, the machine learning engine 118 includes, among other components, a data analysis and pattern recognition module, a prediction/training module, an anomaly detection module, a decision-making module, and an adaptive learning module. The data analysis and pattern recognition module may use specific machine learning algorithms to identify patterns, trends, and correlations within the traffic environment data as well as location and position measurements data to identify and quantify relationships between different variables used to guide navigation for the autonomous vehicle 101. The prediction/training module can train a machine learning model to predict traffic congestion, road conditions, or the behavior of the autonomous vehicle 101 and/or nearby vehicles within the virtual zone 104, based on the identified patterns and trends. The prediction/training module can further train a machine learning model to optimize the route optimization engine 114 in calculating and selecting optimal routes to a destination. The anomaly detection module can be used to identify unusual patterns or outliers that may indicate potential faults or anomalies in the autonomous vehicle 101 or its surroundings within the virtual zone 104. The decision-making module utilizes the trained machine learning model and the available data to make informed decisions about the optimal route or route segment for the autonomous vehicle 101. In some embodiments, the decision-making module is responsible for making immediate navigation decisions based on the current status of the autonomous vehicle 101 and the associated real-time traffic environment data and location and position measurements data associated with the autonomous vehicle 101, as well as making adjustment of the predicted optimal routes and route segments as needed. The adaptive learning module can update the machine learning algorithms and models to improve the accuracy for predictions, decision-making, and overall navigation performance.

The database 122 within the CPC 110 may be used to store and manage various data or information, including but not limited to digital maps, traffic environment data, location and position measurements data, machine learning models and algorithms, authentication and security data, user/vehicle identities, user/vehicle profiles, user preferences, historical data and analytics, and so on. The database 122 may allow the CPC 110 to instantaneously or nearly instantaneously access and retrieve necessary data during real-time operations.

Figure 3:
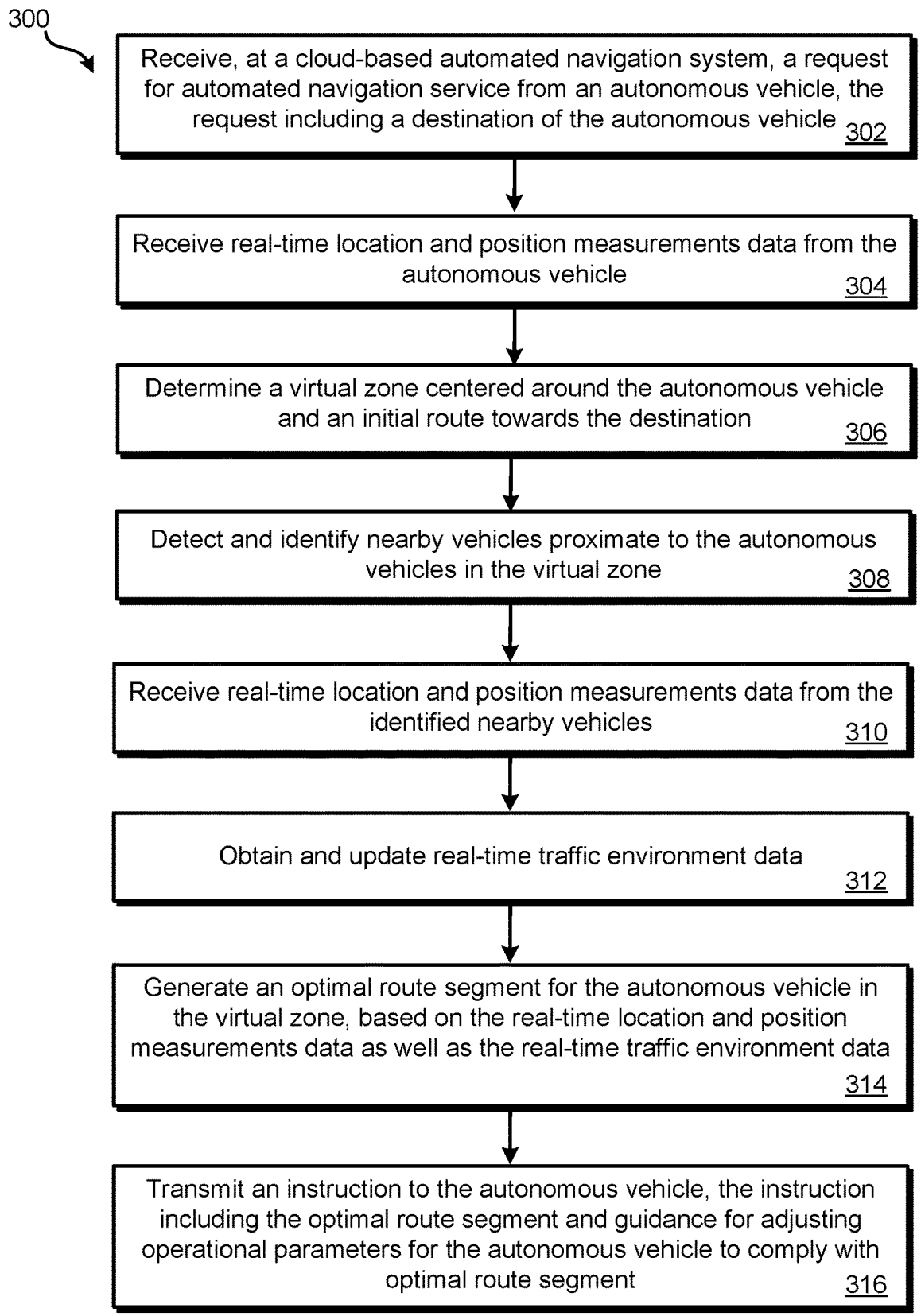
FIG. 3 is a flow diagram illustrating an example method for provisioning automated navigation to an autonomous vehicle, according to various embodiments.

FIG. 3 is a flow diagram illustrating an example method 300 for automated navigation provisioning, according to various embodiments. The method may be implemented by one or more components included in the systems 100 or 200 described herein. Depending on the implementation, the method 300 may include additional, fewer, or alternative steps performed in various orders or in parallel.

At 302, a request for automated navigation service is generated by an autonomous vehicle, transmitted to and received in a cloud-based automated navigation system. The request includes user information such as a user identity, user profile, authentication credentials and data, etc., in relation to the autonomous vehicle and a destination of the autonomous vehicle. Upon receipt of the request, the automated navigation system may authenticate the autonomous vehicle based on the authentication credentials and data provided in the request and the pre-registered user information in the automated navigation system.

At 304, real-time location and position measurements data from the autonomous vehicle is transmitted to and received in the automated navigation system. The real-time location and position measurements data may be generated by the autonomous vehicle from various sources including GPS signals, RFID signals, signals transmitted from other sensors, etc. The location and position measurements data may include the geographic coordinates indicating latitude, longitude, and altitude position for individual components and the overall vehicle outline of the autonomous vehicle with an accuracy of centimeter scale.

At 306, a virtual zone centered around the autonomous vehicle is determined by the automated navigation system. The virtual zone is defined as a spatial region centered around the autonomous vehicle and is dynamically adjusted as the vehicle progresses towards the destination. The boundaries of the virtual zone are established based on the precise location and position measurements data, such as latitude, longitude, and altitude coordinates, dimensions and shape of the autonomous vehicle, as well as the traffic environment data. The virtual zone is continuously updated to maintain an appropriate spatial coverage around the autonomous vehicle. An initial route towards the destination for the autonomous vehicle is also determined by the automated navigation system. The initial route is continuously optimized while the autonomous vehicle progresses towards the destination.

At 308, nearby and surrounding vehicles as well as other stationary and moving objects proximate to the autonomous vehicle within the virtual zone are detected and identified by the automated navigation system. In some embodiments, location and position measurements data from a nearby vehicle is received by the automated navigation system, a determination is made on whether the nearby vehicle is within the boundaries of the virtual zone or within a predetermined range from the outline of the autonomous vehicle, and presence of the nearby vehicle is identified based on the determination. In some embodiments, presence of a nearby vehicle in the virtual zone may be identified based on real-time traffic environment data or data from other sources such as sensors installed in the traffic infrastructure, satellite systems, or other suitable tracking/detecting/monitoring devices. The automated navigation system can continuously monitor the dynamics of the virtual zone and detect and identify the nearby vehicles that come into the virtual zone while the autonomous vehicle progresses towards the destination.

At 310, real-time location and position measurements data from the identified nearby vehicles is received by the automated navigation system. The location and position measurements data may include information such as latitude, longitude, altitude, orientation, velocity, and other relevant parameters that describe the current state and dynamics of the nearby vehicles. By continuously receiving and updating this real-time location and position measurements data, the relative positions, distances, and movements of the nearby vehicles with respect to the autonomous vehicle in the virtual zone may be accurately assessed.

At 312, real-time traffic environment data in the virtual zone is obtained and updated by the automated navigation system. The traffic environment data includes information about the current state of the traffic within the virtual zone indicating a traffic flow condition, a traffic infrastructure condition, and a traffic disruption condition. The traffic environment data may include information regarding average traffic flow speed, traffic congestion, road conditions, traffic signals, construction zones, special events, road closures, and other relevant traffic-related information. The real-time traffic environment data may be obtained from various resources such as traffic sensors installed in the road infrastructure, traffic information providers, satellite imagery and aerial surveillance systems, etc.

At 314, an optimal route segment for the autonomous vehicle in the virtual zone is generated by the automated navigation system, based on the real-time location and position measurements data as well as the real-time traffic environment data. The initial route is continuously optimized, based on the updated real-time update on location and position measurements data from the autonomous vehicle and nearby vehicles within the virtual zone, as well as the updated real-time update on traffic environment data. Multiple optimal route segments may be generated respectively at multiple time points (T) when the autonomous vehicle progresses towards the destination. As an example, at a first time point ($T_1$), a first optimal route segment for the autonomous vehicle in the virtual zone is generated, based on the real-time location and position measurements data as well as the real-time traffic environment data at $T_1$. At a second time point ($T_2$) after $T_1$, a second optimal route segment for the autonomous vehicle in the virtual zone is generated based on the real-time location and position measurements data as well as the real-time traffic environment data received at $T_2$. The time interval between $T_1$ and $T_2$ may be at microseconds scale, for example, less than 50 milliseconds, less than 25 milliseconds, or less than 10 milliseconds, such that the optimal route is instantaneously or nearly instantaneously updated in a continuous manner.

At 316, an instruction is generated by the automated navigation system and transmitted to the autonomous vehicle. The instruction includes the optimal route segment and guidance for adjusting operational parameters for the autonomous vehicle to comply with the optimal route segment. The instruction is received by the autonomous vehicle, and the autonomous vehicle may follow the guidance to adjust the operational parameters accordingly. In one example, a first instruction including a first optimal route segment determined at $T_1$ is received by the autonomous vehicle, and the operational parameters are adjusted according to the first instruction to cause the autonomous vehicle to substantially follow the first route segment from $T_1$ to $T_2$. A second instruction including a second optimal route segment determined at $T_2$ is received by the autonomous vehicle, and the operational parameters are adjusted according to the second instruction to cause the autonomous vehicle to substantially follow the second route segment from $T_2$ to the subsequent time point. By continuously receiving and following the instructions and adjusting operational parameters, the autonomous vehicle can navigate efficiently and effectively, dynamically adapting to the changing optimal route segments determined by the automated navigation system.

Figure 4:
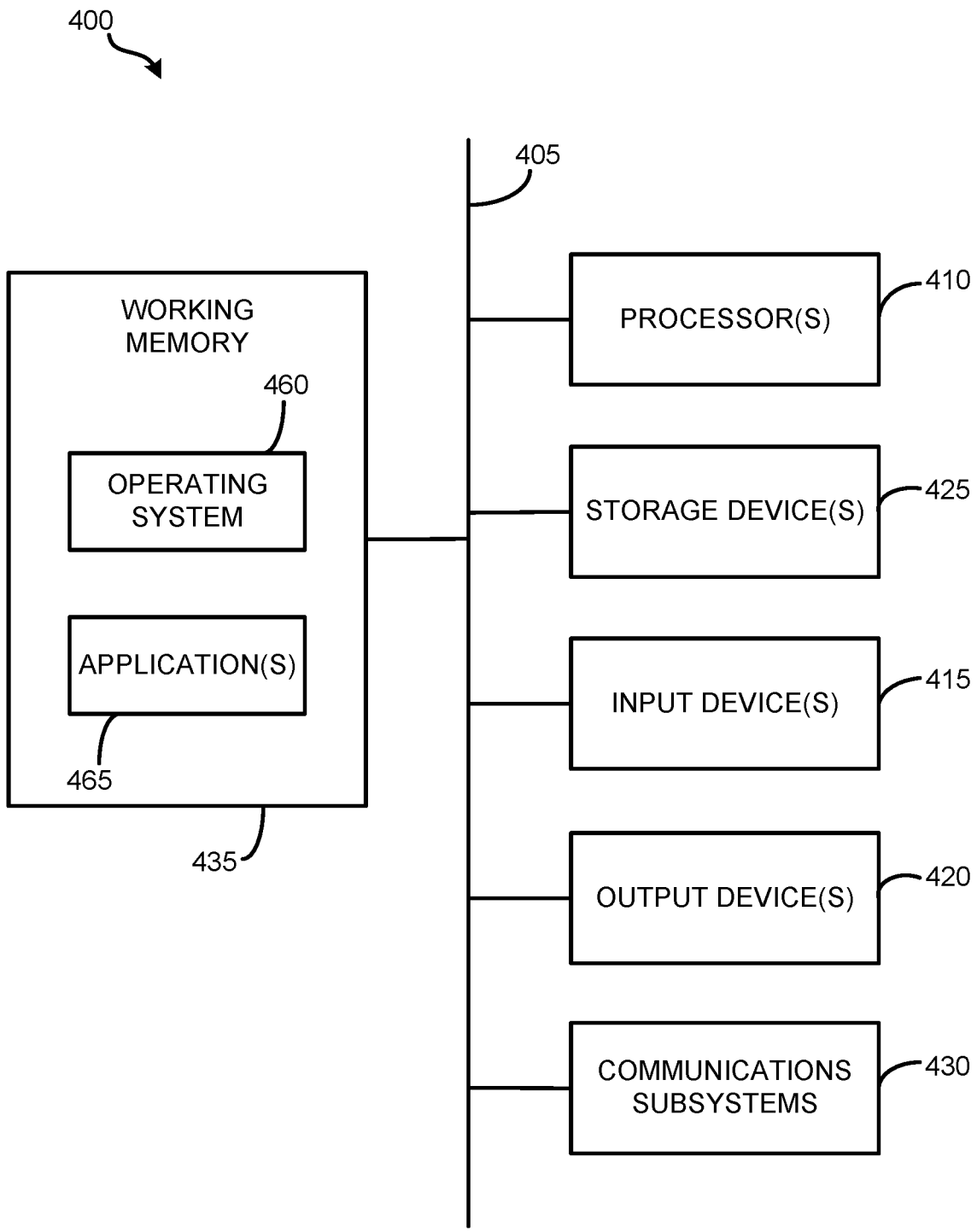
FIG. 4 is a schematic diagram illustrating an example of computer system or computer device, according to various embodiments.

The automated navigation system and other components in the system 100 or 200 described above may include a computer system that further includes computer hardware and software that form special-purpose network circuitry to implement various embodiments such as communication, calculation, navigation service provisioning, and so on. FIG. 4 is a schematic diagram illustrating an example of computer system 400. The computer system 400 is a simplified computer system that can be used to implement various embodiments described and illustrated herein. FIG. 4 provides a schematic illustration of one embodiment of a computer system 400 that can perform some or all of the steps of the methods and workflows provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405, or may otherwise be in communication, as appropriate. The hardware elements may include one or more processors 410, including without limitation one or more general-purpose processors and/or one or more special-purpose processors such as digital signal processing chips, graphics acceleration processors, and/or the like; one or more input devices 415, which can include without limitation a mouse, a keyboard, a camera, and/or the like; and one or more output devices 420, which can include without limitation a display device, a printer, and/or the like.

The computer system 400 may further include and/or be in communication with one or more non-transitory storage devices 425, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 430 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 430. In other embodiments, a portable electronic device, e.g., the first electronic device, may be incorporated into the computer system 400, e.g., an electronic device as an input device 415. In some embodiments, the computer system 400 will further include a working memory 435, which can include a RAM or ROM device, as described above.

The computer system 400 also can include software elements, shown as being currently located within the working memory 435, including an operating system 460, device drivers, executable libraries, and/or other code, such as one or more application programs 465, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 425 described above. In some cases, the storage medium might be incorporated within a computer system, such as computer system 400. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 400 and/or might take the form of source and/or installable code, which, upon compilation and/or installation on the computer system 400 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 400 to perform methods in accordance with various embodiments of the technology. According to a set of embodiments, some or all of the operations of such methods are performed by the computer system 400 in response to processor 410 executing one or more sequences of one or more instructions, which might be incorporated into the operating system 460 and/or other code, such as an application program 465, contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 and/or components thereof generally will receive signals, and the bus 405 then might carry the signals and/or the data, instructions, etc. carried by the signals to the working memory 435, from which the processor(s) 410 retrieves and executes the instructions. The instructions received by the working memory 435 may optionally be stored on a non-transitory storage device 425 either before or after execution by the processor(s) 410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Various aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a vehicle" includes a plurality of such vehicles, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method comprising:
   receiving, in an automated navigation system in communication with an autonomous vehicle operating in a traffic environment over a wireless network, a request for automated navigation service from the autonomous vehicle, the request including vehicle information and a destination of the autonomous vehicle;
   receiving continuously, in the automated navigation system, real-time location and position measurements data from the autonomous vehicle;
   determining, by the automated navigation system, a virtual zone centered around the autonomous vehicle and extending to a boundary, based on the real-time location and position measurements data;
   identifying, by the automated navigation system, nearby vehicles proximate to the autonomous vehicles within the boundary of the virtual zone;
   receiving continuously, in the automated navigation system, real-time location and position measurements data of the identified nearby vehicles;
   obtaining and updating, by the automated navigation system, real-time traffic environment data of the traffic environment;
   generating, by the automated navigation system, a first optimal route segment for the autonomous vehicle in the virtual zone, based on the real-time location and position measurements data as well as the real-time traffic environment data received at a first time point ($T_1$); and
   transmitting, from the automated navigation system, a first instruction to the autonomous vehicle, the first instruction including the first optimal route segment and guidance for adjusting operational parameters for the autonomous vehicle to comply with the first optimal route segment until a second time point ($T_2$) later than $T_1$;
   wherein one or more servers of the automated navigation system are located in proximity to the autonomous vehicle and cache the real-time location and position measurements data from the autonomous vehicle and/or the real-time location and position measurements data of the identified nearby vehicles.

2. The method of claim 1, wherein the wireless network has a latency level no more than 50 milliseconds (ms) based at least in part on the one or more servers caching the real-time location and position measurements data from the autonomous vehicle and the real-time location and position measurements data of the identified nearby vehicles.

3. The method of claim 1, further comprising:
   authenticating the autonomous vehicle, based on the vehicle information.

4. The method of claim 1, wherein the real-time location and position measurements data comprises geographic coordinates indicating latitude, longitude, and altitude position for individual components and an overall vehicle outline of the autonomous vehicle with an accuracy of centimeter (cm) scale.

5. The method of claim 1, further comprising:
   receiving, in the autonomous vehicle, real-time GPS signals and signals;
   fusing, by the autonomous vehicle, real-time GPS and RFID signals to generate the real-time location and position measurements data; and
   transmitting the real-time location and position measurements data to the automated navigation system.

6. The method of claim 1, wherein the real-time traffic environment data indicates a current state of the traffic within the virtual zone indicating a traffic flow condition, a traffic infrastructure condition, and a traffic disruption condition.

7. The method of claim 1, wherein a time interval between $T_1$ and $T_2$ is 50 milliseconds or less.

8. The method of claim 1, further comprising:
   generating, by the automated navigation system, a second optimal route segment for the autonomous vehicle in the virtual zone, based on the real-time location and position measurements data as well as the real-time traffic environment data received at $T_2$; and
   transmitting, from the automated navigation system, a second instruction to the autonomous vehicle, the second instruction including the second optimal route segment and guidance for adjusting operational parameters for the autonomous vehicle to comply with the second optimal route segment until a subsequent time point later than $T_2$.

9. The method of claim 1, wherein the first optimal route segment is represented by a plurality of three-dimensional (3D) positions, each 3D position is further represented by a set of Cartesian coordinates [X, Y, Z] corresponding to latitude, longitude, and altitude of the 3D position.

10. The method of claim 1, further comprising:
    transmitting continuously, the real-time location and position measurements data of the identified nearby vehicles to the autonomous vehicle.

11. An automated navigation system in communication with an autonomous vehicle over a network operating in a traffic environment, the automated navigation system comprising:
    one or more processors; and a computer-readable storage media storing computer-executable instructions that, when executed by the one or more processors, cause the automated navigation system to:

receive a request for automated navigation service from the autonomous vehicle, the request including vehicle information and a destination of the autonomous vehicle;

receive continuously real-time location and position measurements data from the autonomous vehicle;

determine a virtual zone centered around the autonomous vehicle and extending to a boundary, based on the real-time location and position measurements data;

identify nearby vehicles proximate to the autonomous vehicles within the boundary of the virtual zone;

receive continuously real-time location and position measurements data from the identified nearby vehicles;

obtain and update real-time traffic environment data of the traffic environment;

generate a first optimal route segment for the autonomous vehicle in the virtual zone, based on the real-time location and position measurements data as well as the real-time traffic environment data received at a first time point ($T_1$); and transmit a first instruction to the autonomous vehicle, the first instruction including the first optimal route segment and guidance for adjusting operational parameters for the autonomous vehicle to comply with the first optimal route segment until a second time point ($T_2$) later than $T_1$;

wherein one or more servers of the automated navigation system are located in proximity to the autonomous vehicle and cache the real-time location and position measurements data from the autonomous vehicle and/or the real-time location and position measurements data of the identified nearby vehicles.

12. The automated navigation system of claim 11, wherein the network has a latency level no more than 50 milliseconds (ms).

13. The automated navigation system of claim 11, wherein the computer-executable instructions when executed by the one or more processors further cause the automated navigation system to:

authenticate the autonomous vehicle, based on the vehicle information.

14. The automated navigation system of claim 11, wherein the real-time location and position measurements data comprises geographic coordinates indicating latitude, longitude, and altitude position for individual components and an overall vehicle outline of the autonomous vehicle with an accuracy of centimeter (cm) scale.

15. The automated navigation system of claim 11, wherein the real-time location and position measurements data of the autonomous vehicle is generated by fusing real-time GPS signals and RFID signals of the autonomous vehicle.

16. The automated navigation system of claim 11, wherein the real-time traffic environment data indicates a current state of the traffic within the virtual zone indicating a traffic flow condition, a traffic infrastructure condition, and a traffic disruption condition.

17. The automated navigation system of claim 11, wherein a time interval between $T_1$ and $T_2$ is 50 milliseconds or less.

18. The automated navigation system of claim 11, wherein the computer-executable instructions when executed by the one or more processors further cause the automated navigation system to:

generate a second optimal route segment for the autonomous vehicle in the virtual zone, based on the real-time location and position measurements data as well as the real-time traffic environment data received at $T_2$; and transmit a second instruction to the autonomous vehicle, the second instruction including the second optimal route segment and guidance for adjusting operational parameters for the autonomous vehicle to comply with the second optimal route segment until a subsequent time point later than $T_2$.

19. The automated navigation system of claim 11, wherein the first optimal route segment is represented by a plurality of 3D positions, each 3D position is further represented by a set of Cartesian coordinates [X, Y, Z] corresponding to latitude, longitude, and altitude of the 3D position.

20. The automated navigation system of claim 11, wherein the computer-executable instructions when executed by the one or more processors further cause the automated navigation system to:

transmit continuously, the real-time location and position measurements data of the identified nearby vehicles to the autonomous vehicle.

* * * * *